July 10, 1962     J R. WRIGHT     3,043,508
ELECTRONIC MULTIPLIER FOR FLUID DISPENSERS
Filed Sept. 24, 1958
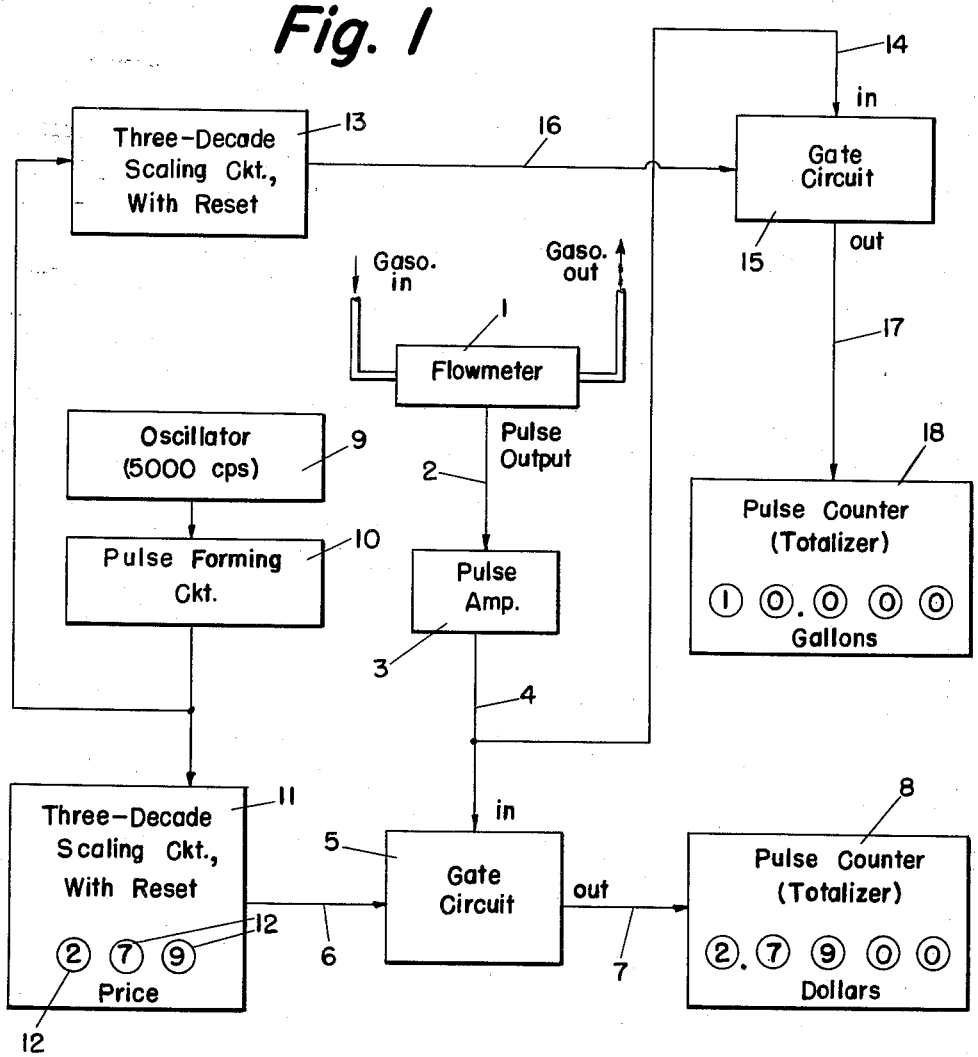
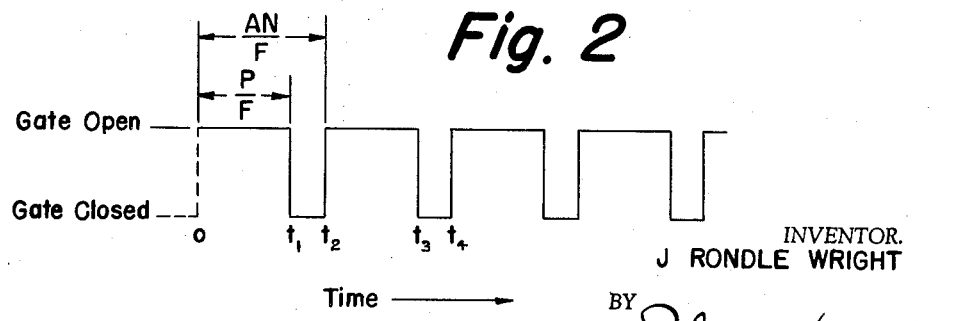
INVENTOR.
J RONDLE WRIGHT
BY
ATTORNEY

United States Patent Office 3,043,508
Patented July 10, 1962

3,043,508
ELECTRONIC MULTIPLIER FOR FLUID DISPENSERS
J Rondle Wright, Newtown Square, Pa., assignor to Sun Oil Company, Philadelphia, Pa., a corporation of New Jersey
Filed Sept. 24, 1958, Ser. No. 763,085
10 Claims. (Cl. 235—151)

This invention relates to an electronic multiplier circuit for fluid dispensers, and more particularly to an electronic arrangement for multiplying the signal (representing gallons) from a pulse generating type of fluid flow meter by any selected price, to obtain the total cost of the fluid dispensed.

Recently, there have been developed flow meters of the rotating-vane type whose output is in the form of alternating current pulses, the total number of such pulses generated in a time interval being directly proportional to the total quantity of fluid (e.g., gasoline) that has passed through the flow meter in this same time interval, and the frequency of the alternating current, or the recurrence rate of the pulses, being directly proportional to the rate of flow of the fluid through the flow meter.

For the purpose of metering the gasoline being dispensed in a service station by means of an ordinary dispensing pump, the rotating-vane type of flow meter has several advantages as compared to the displacement type of flow meter now commonly used in gasoline dispensing pumps. In the first place, the rotating-vane type of flow meter is small, simple in construction, and contains relatively few parts, so it could be much less expensive than the displacement-type flow meter. In the next place, due in large measure to its simple construction, the rotating-vane type of flow meter has a much longer trouble-free life than does the displacement-type flow meter.

As previously described, the rotating-vane type of flow meter has an output in the form of an electrical signal, and specifically in the form of alternating current pulses. This, of course, calls for an electrical display of the results of the dispensing operation, as contrasted with the mechanical display called for by the displacement-type flow meter. An electrical display provides several advantages, among which are that it is very easy to make such a display remote from the pump, and it is then also extremely easy to provide multiple indicators, if necessary or desirable.

An object of this invention is to provide an electronic multiplier circuit for gasoline dispensers, of a type which will enable the rotating-vane or pulse-generating type of flow meter to be used in such dispensers.

Another object is to provide a novel electronic multiplier circuit for fluid dispensers.

A further object is to provide a novel multiplier circuit for fluid dispensers, which will effect an electrical display of the results of the dispensing operation.

The objects of this invention are accomplished, briefly, in the following manner. The fluid being dispensed is passed through a flow meter which produces electrical pulses at a recurrence rate proportional to the rate of passage of fluid through the meter. These pulses are counted over short intervals of time, the length of each interval being proportional to the price per unit volume (gallon) of the fluid. By counting the total number of pulses during all of these intervals, that is, during the entire dispensing operation, the total price of the fluid dispensed may be determined.

A detailed description of the invention follows, taken in conjunction with the accompanying drawing, wherein:

FIG. 1 is a block diagram of a multiplier circuit according to this invention; and FIG. 2 is a time-condition diagram useful in explaining the invention.

First referring to FIG. 1, a flow meter 1 of the rotating-vane or pulse-generating type serves as the sensing element of the gasoline dispensing system. The gasoline or other fluid being dispensed passes through the flow meter 1, as indicated by the legends "Gasoline In" and "Gasoline Out." By way of example, the flow meter 1 may be of the type disclosed in Patent No. 2,709,755, dated May 31, 1955, and operates to produce alternating current pulses on the flow meter pulse output lead 2. In such a meter, the total number of pulses generated or produced is directly proportional to the total quantity of fluid that is passed through the meter, so it may be stated that the meter produces a predetermined number of electrical pulses (predetermined by the characteristics of the particular flow meter being used, and known beforehand, from the initial calibration of such meter) per unit volume of fluid passing therethrough. Also, it is a characteristic of this type of flow meter that the recurrence rate of the pulses produced (or expressed in another way, the frequency of the alternating current produced) is directly proportional to the rate of flow of the fluid through the flow meter, or to the rate of passage of the fluid through such meter.

The pulse output of flow meter 1, appearing on output lead 2, is fed through a pulse amplifier 3 to the input 4 of a gate circuit 5 which is of more or less conventional construction and is therefore not illustrated in detail. By way of example, amplifier 3 may be an ordinary resistance-capacitance coupled amplifier, such as shown in Figure 111, on page 111 of Radar Electronic Fundamentals (NAVSHIPS 900,016), published by the Navy Department, Washington, June 1944. Gate 5 has a control connection 6 and an output 7, as well as the input 4. When the gate 5 is "opened" by a suitable voltage applied to its control connection 6, the pulses applied to its input 4 appear at its output 7, but when gate 5 is "closed" by a voltage of the opposite sense applied to its control connection 6, the pulses applied to the input 4 are cut off or gated off from the output 7. Gate 5 may be of any conventional type, such as illustrated in FIGURE 249, on page 229 of Radar Electronic Fundamentals.

The output 7 of the gate 5 is coupled to the input of a pulse counter or totalizer circuit 8, which latter circuit counts and indicates the total number of pulses supplied thereto from the gate 5, during a fluid dispensing operation. The pulse counter 8 may comprise a plurality of so-called "Mixie" indicator tubes combined with counter-tubes arranged in a suitable pulse-counting circuit, or it may comprise a plurality of "glow transfer" tubes arranged in the form of a counting chain and provided with suitable indicators. If the gate 5 is opened, and left open for a time interval whose length is proportional to the price per unit volume (gallon) of fluid, the total number of pulses counted by counter 8 during the dispensing operation will be representative of the total price of the fluid dispensed. This will be explained further hereinafter.

It will now be explained how the gate 5 is opened and closed in the proper manner. A fixed-frequency oscillator 9, operating for example around 5000 c.p.s., has its output applied to a suitable pulse-forming circuit 10 so as to produce in the output of this latter circuit pulses at the repetition rate or recurrence rate of 5000 p.p.s. The oscillator 9 may for example be a phase-shift oscillator such as disclosed in Figure 162, on page 154 of Radar Electronic Fundamentals; the circuit 10 may for example be a limiter-differentiator circuit such as disclosed in Figure 182, on page 170 of this same publication. The output of circuit 10 is coupled to the input of a three-decade scaling circuit 11. The circuit 11 may be any conventional decade scaler which may be preset, such as the ring type, or a scaler using decade glow transfer tubes. The scaler 11 may be a type of counting circuit which counts the pulses supplied thereto from circuit 10 (or oscillator 9). The output connection of the scaler 11 is coupled to the control connection 6 of gate 5.

The scaler has two preset (manually-adjustable) points. It is assumed that at zero time (the start of the dispensing operation, when the various circuits are energized) the gate 5 is open. By proper design, this can easily be made the case. Starting from zero, when the count of the pulses supplied from circuit 10 to scaler 11 reaches the first preset point of the scaler, a voltage is developed at the control connection 6 of the gate 5 which is of the proper polarity and magnitude to close this gate. When the count of the pulses (at the frequency of oscillator 9) by scaler 11 reaches the second preset point of the scaler, a voltage of the opposite sense is developed at the scaler output. This voltage, applied to gate control connection 6, opens the gate 5. In addition, this last voltage, by means of internal connections in the scaler 11, resets this scaler. Conditions, insofar as the scaler 11 is concerned, are then just as they were at zero time, so the above action repeats, with counting, closing and opening of gate 5, etc. It may therefore be seen that the gate 5 is open from zero time to the first preset point, closed from the first preset point to the second preset point, then open again until the first preset point is again reached, and so on throughout the dispensing operation, or as long as the various circuits are energized.

For a given fluid (gasoline) pump and flow meter 1, the second preset point is permanently set (fixed), the criteria for setting this second point being set forth hereinafter. The first preset point, the one which effects a closing of gate 5, is manually set (or automatically set) at a position determined by the price per unit volume (gallon) of the fluid being dispensed. This price may vary from day to day, or with various grades of gasoline. This setting of the first preset point may be effected by the operation of suitable switches (not shown) provided on the scaler 11 chassis, in association with the digit dials 12. As illustrated, the scaling circuit 11 has been set to a first preset point of 27.9¢/gal., the digits 2, 7, and 9 being illustrated on dials 12.

Let N represent the number of counts (pulses) per gallon from the flow meter 1, and P the price per gallon of gasoline, expressed in mills. Then, the first preset point on the scaling circuit 11 is set at P. The factor N is fixed for a given flow meter, is predetermined by the characteristics of the given flow meter, and is known from the initial calibration of such given meter. The second (fixed) preset point is set at some simple multiple of N, say AN, where A is a simple fraction, less than unity. The produce AN must always be selected to be greater than P, and this second preset point is set permanently, for each flowmeter-pump combination. Let F represent the frequency of the fixed-frequency oscillator 9, or the recurrence rate of the pulses out of circuit 10 and counted by scaler 11. Then, as illustrated in FIG. 2, beginning from zero time, the gate 5 will be open for a time $t_1$ which is $P/F$, since the first present point is set at P, and since the gate is open from zero time to the first preset point. Opening of the gate occurs again at the second preset point AN. Thus, as illustrated in FIG. 2, the gate 5 will be closed for a time $t_2-t_1$ which is $AN-P/F$, since the gate is closed from the first preset point P to the second preset point AN. The gate is opened several times per second (at the time intervals beginning at zero, $t_2$, $t_4$, etc.), and each time it is left open a length of time $P/F$ which is proportional to the price P. In other words, the length of each "open" interval is proportional to the price.

The fraction of the overall dispensing time during which the gate is open, is $P/AN$. This may be seen from an examination of FIG. 2, wherein it will be noted that one complete cycle of the scaler 11 (from zero until it is reset back to zero) extends from zero to $t_2$, or from $t_2$ to $t_4$, etc. Therefore, in delivering G gallons of gasoline, the total number of counts or pulses registered at the counter 8 will be $$GN\frac{P}{GN} \qquad (1)$$

which reduces to $$\frac{1}{A}GP$$

so that the total number of pulses registered is proportional to the product of the total number of gallons G and the price P. The total counts can now be multiplied by a simple ratio A (and divider by 1000, since P is in mills) to give and display the total cost in dollars.

It is desired to be pointed out that the results are independent of F, the frequency of the fixed-frequency oscillator 9. However, the frequency of this oscillator determines the sampling rate, that is, the number of times the gate 5 is opened per second. This sampling rate should be fast enough (or, the sample cycles should be short enough) so that the flow rate through the flow meter, and hence the recurrence rate of the flow meter pulses, cannot appreciably change during the sampling cycle. In other words, the sampling time intervals are so short that for practical purposes the flow rate during the sampling time interval may be considered constant.

In the electronic multiplier arrangement described, the number of counts per gallon from the flow meter can be easily set in the multiplying circuit (by setting the second preset point of scaler 11 at AN, where N is the number of counts per gallon from the flow meter), so that it is easy to correct for considerable variation in the constants of different flow meters.

To illustrate a practical arrangement, assume the flow meter 1 has a constant N of 3650 counts (pulses) per gallon. Flow meters are available, or can easily be made, to give "N" values between 1000 and 5000 counts per gallon. The oscillator 9 has a frequency of 5000 c.p.s., so that 5000 pulses per second are applied to scaler 11. The second set-point (AN) of the scaler 11 is set at 365, so that $A=0.1$, or $1/A=10$. Then, if the price of gasoline is 27.9¢/gal., the first set-point (P) of the scaler is set at 279, which is this price expressed in mills.

At zero time, gate 5 is open. The scaler 11, beginning at zero time, counts pulses from circuit 10 (or from the oscillator 9) until the first set-point of 279 is reached; at this point (time $t_1$, FIG. 2) the gate 5 is closed by the action of the scaling circuit. The scaler continues to count until the second set-point of 365 is reached. Then (time $t_2$, FIG. 2) the scaler opens the gate 5, resets itself, and continues counting the pulses from the fixed-frequency oscillator 9, until at time $t_3$ a count of 279 is again reached, and so on.

In delivering ten gallons (G) of gasoline, the flow meter 1 will deliver $GN=36500$ pulses to the input 4 of gate 5, but this gate will be open only a fraction $P/AN=279/365$ of the time. The total number of pulses which reach the totalizer 8 is therefore $$\frac{279}{365}\times 36500 = 27,900$$

The result of 27,900 on the totalizer may now be multiplied by A (which in this case is 0.1) and divided by 1000 (see equation 1 above) to give the total cost in dollars of ten gallons of gasoline at 27.9¢/gal., which total cost is of course $2.79, as indicated on the dials of totalizer 8 of FIG. 1. Note that the least count of the system is one-hundredth of a cent, as indicated by the dials of totalizer 8.

In this example, the sampling rate is 5000/365=about 13.6 per second. At a flow rate of 5 gallons per minute, the pulse rate from the flow meter 1 is $$\frac{5 \times 3650}{60} = 304 \text{ pulses per second}$$

so that during each sampling period there would be 304/13.6=about 22.3 pulses supplied to totalizer 8.

There has previously been described a multiplier circuit which in effect multiplies a number of pulses representing a certain quantity of gasoline by the price, to ascertain (and indicate) the total price of the gasoline dispensed. To ascertain the total number of gallons of gasoline dispensed, we must in effect multiply this number of pulses representing the quantity of gasoline, by a different number. A multiplier arrangement substantially similar to that previously described, may be used to indicate the total number of gallons of fluid dispensed.

Another three-decade scaling circuit 13 may have its input coupled to the output of circuit 10. Circuit 13 may, like circuit 11, have two preset points, but in this case both the first and second preset points are permanent, being the same at all times for any particular flowmeter. Thus, no dials and switches are needed for adjustment of the first preset point in scaler 13, unlike scaler 11.

The pulse output of flow meter 1 is also fed through amplifier 3 to the input 14 of a gate circuit 15. Gate 15 has a control connection 16 and an output 17, as well as the input 14. Gate 15 may be exactly like gate 5, and operates similarly. The output of gate 15 is coupled to the input of a pulse counter or totalizer circuit 18, which latter counts and indicates the total number of pulses supplied thereto from the gate 15, during a dispensing operation. The output connection of scaler 13 is coupled to the control connection 16 of gate 15.

Gate 15 is open from zero time to the first preset point of scaler 13, closed from the first preset point to the second preset point of this scaler, then open again until the first preset point is again reached, and so on.

Let N' represent the number of counts (pulses per 1/1000 gallon) from flow meter 1, and X a number at which the first preset point on the scaling circuit 13 is set. The second preset point of scaler 13 is set at some multiple of N', say A'N', where A' is an integer greater than unity. The product A'N' must always be selected to be greater than X, and N' is of course fixed or permanent for any given flow meter, and is known. Let G' represent the number of 1/1000 gallons dispensed. By analogy from FIG. 2, beginning from zero time, the gate 15 will be open for a time X/F, since the first preset point thereof is set at X. Opening of the gate occurs again at the second preset point A'N'. The gate 15 will be closed for a time A'N'−X/F, and the fraction of the overall dispensing time during which gate 15 is open, is X/A'N'.

In delivering $$G'\frac{1}{1000}$$

gallons of gasoline, the total number of counts or pulses registered at counter 18 will be $$G'N'\frac{X}{A'N'}=\frac{X}{A'}G' \qquad (2)$$

Now, if X is made equal to A' (this can be done in the original design of the system and is the reason why the first preset point X of scaler 13 is fixed), the total number of pulses delivered to counter 18 will be G', the number of 1/1000 gallons dispensed. The factor A' is fixed in the original design of the system, and since N' is also fixed, the second preset point A'N' of scaler 13 is fixed or permanent.

To continue with the example previously given, if the flow meter 1 delivers 3650 counts per gallon, it will deliver N'=3.65 pulses per 1/1000 gallon. Now, if A'=100 and X equals A', the first set-point X of scaler 13 is 100, and the second set-point A'N' is 365.

At zero time, gate 13 is open. The scaler 13, beginning at zero time, counts pulses from circuit 10 until the first set-point of 100 is reached; at this point the gate 15 is closed by the action of the scaling circuit. The scaler 13 continues to count until the second set-point of 365 is reached. Then, scaler 13 opens gate 15, resets itself, and continues counting the pulses from oscillator 9 until a count of 100 is again reached, and so on.

In delivering ten gallons of gasoline (G'=10,000), the flow meter 1 will deliver G'N'=36500 pulses to the input 14 of gate 15, but this gate will be open only a fraction X/A'N'=100/365 of the time. The total number of pulses which reach totalizer 18 is therefore $$\frac{100}{365} \times 36500 = 10,000$$

The result of 10,000 on the totalizer must be set off by a properly-placed decimal point (i.e., it must be divided by 1000, since G' in Equation 2 is expressed in units of 1/1000 gallon), to indicate the total quantity (in gallons) of gasoline dispensed.

Since the first and second preset points of scaler 13 are both predetermined by the initial or original design and are fixed or permanent, the scaler 13 could be eliminated and gate 15 could be operated from scaler 11, particularly if this scaler is of the ring counter type, or if it uses glow transfer tubes. To do this, connections would be made from the proper set-points in scaler 11, to gate 15.

The invention claimed is:

1. In a fluid dispensing system, a flow meter through which passes the fluid being dispensed, said flow meter producing electrical pulses whose recurrence rate is proportional to the rate of passage of fluid through said flow meter, a controllable gate having a control connection, an input, and an output; means for applying the pulse output of said flow meter to the input of said gate, means coupled to said control connection for opening said gate only during an adjustable and presettable portion of the entire dispensing time proportional to the predetermined price per unit volume of the fluid, and means coupled to the output of said gate for counting and indicating the total number of pulses gated to said gate output during a dispensing operation.

2. In a fluid dispensing system, a flow meter through which passes the fluid being dispensed, said flow meter producing a predetermined number of electrical pulses per unit volume of fluid passing therethrough, the recurrence rate of said pulses being proportional to the rate of passage of fluid through said flow meter, a controllable gate having a control connection, an input, and an output; means for applying the pulse output of said flow meter to the input of said gate, means coupled to said control connection for opening said gate only during a fraction $P/N \times 1/A$ of the entire dispensing time, where P is the predetermined price per unit volume of the fluid, expressed in mills, 1/A is a preselected integer greater than one, and N is the predetermined number of pulses produced by said flow meter per unit volume of fluid; and means coupled to the output of said gate for counting and indicating the total number of pulses gated to said gate output during a dispensing operation, thereby to indicate the total price of the fluid dispensed.

3. In a fluid dispensing system, a flow meter through which passes the fluid being dispensed, said flow meter producing electrical pulses whose recurrence rate is proportional to the rate of passage of fluid through said flow meter, a controllable gate having a control connection, an input, and an output; means for applying the pulse output of said flow meter to the input of said gate, means coupled to said control connection for repeatedly opening and then closing said gate, the time duration of each open interval being preset and being proportional to the predetermined price per unit volume of the fluid, and means coupled to the output of said gate for counting and indicating the total number of pulses gated to said gate output during a dispensing operation.

4. In a fluid dispensing system, a flow meter through which passes the fluid being dispensed, said flow meter producing electrical pulses whose recurrence rate is proportional to the rate of passage of fluid through said flow meter, a controllable gate having a control connection, a signal input, and a signal output, said gate when open operating to pass signal pulses from its signal input to its signal output; means for applying the signal pulse output of said flow meter to the signal input of said gate, means coupled only to said control connection for opening said gate only during a portion of the entire dispensing time proportional to the price per unit volume of the fluid, said last-mentioned means comprising a fixed-frequency oscillator and a manually-settable scaling circuit for counting a manually-set number of cycles of the output of said oscillator; and means coupled to the signal output of said gate for counting and indicating the total number of flow meter signal pulses gated to said gate signal output during a dispensing operation.

5. In a fluid dispensing system, a flow meter through which passes the fluid being dispensed, said flow meter producing a predetermined number of electrical pulses per unit volume of fluid passing therethrough, the recurrence rate of said pulses being proportional to the rate of passage of fluid through said flow meter, a controllable gate having a control connection, a signal input, and a signal output, said gate when open operating to pass signal pulses from its signal input to its signal output; means for applying the signal pulse output of said flow meter to the signal input of said gate, means coupled only to said control connection for opening said gate only during a portion of the entire dispensing time proportional to the price per unit volume of the fluid, said last-mentioned means comprising a fixed-frequency oscillator and a manually-settable scaling circuit for counting a manually-set number of cycles of the output of said oscillator proportional to said price and for thereafter counting a predetermined number of cycles of such oscillator output proportional to said predetermined number of pulses per unit volume of fluid; and means coupled to the signal output of said gate for counting and indicating the total number of flow meter signal pulses gated to said gate signal output during a dispensing operation.

6. In a fluid dispensing system, in combination, a flow meter through which passes the fluid being dispensed, said flow meter producing electrical pulses whose recurrence rate is proportional to the rate of passage of fluid through said flow meter, a controllable gate having a control connection, a signal input, and a signal output, said gate when open operating to pass signal pulses from its signal input to its signal output; means for applying the signal pulse output of said flow meter to the signal input of said gate, an oscillator of fixed frequency, a scaling circuit adapted to count pulses applied to its input and to produce at its output a gate control voltage when the count reaches a preselected number, means for applying pulses derived from said oscillator to the input of said scaling circuit, means connecting the output of said scaling circuit to the control connection of said gate, and a totalizing counter connected to the signal output of said gate.

7. In a fluid dispensing system, in combination, a flow meter through which passes the fluid being dispensed, said flow meter producing a predetermined number of electrical pulses per unit volume of fluid passing therethrough, the recurrence rate of said pulses being proportional to the rate of passage of fluid through said flow meter, a controllable gate having a control connection, a signal input, and a signal output, said gate when open operating to pass signal pulses from its signal input to its signal output; means for applying the signal pulse output of said flow meter to the signal input of said gate, an oscillator of fixed frequency, a scaling circuit adapted to count pulses applied to its input and to produce at its output a first gate control voltage when the count reaches a preselected number and a second gate control voltage when the count reaches a predetermined higher number, means for applying pulses derived from said oscillator to the input of said scaling circuit, means connecting the output of said scaling circuit to the control connection of said gate, and a totalizing counter connected to the signal output of said gate.

8. The combination defined in claim 7, wherein the predetermined higher number is proportional to the predetermined number of pulses per unit volume of fluid, and wherein the second gate control voltage is such as to effect opening of the gate and resetting of the scaling circuit to zero.

9. The combination defined in claim 7, wherein the first and second gate control voltages are of opposite sense.

10. The combination defined in claim 7, wherein the preselected number in said count is proportional to the price per unit volume of the fluid being dispensed, wherein the first gate control voltage is such as to effect closing of the gate, and wherein the first and second gate control voltages are of opposite sense.

References Cited in the file of this patent

UNITED STATES PATENTS

| | | |
|---|---|---|
| 2,062,997 | Orbeck | Dec. 1, 1936 |
| 2,307,435 | Van Opel | Jan. 5, 1943 |
| 2,403,873 | Mumma | July 9, 1946 |
| 2,496,912 | Grosdoff | Feb. 7, 1950 |
| 2,511,006 | Prangley | June 13, 1950 |
| 2,769,595 | Bagley | Nov. 6, 1956 |
| 2,853,235 | Brinster et al. | Sept. 23, 1958 |
| 2,945,183 | Hartke et al. | July 12, 1960 |
| 2,963,222 | Allen | Dec. 6, 1960 |